US012579956B2

(12) United States Patent
Morvan et al.

(10) Patent No.: US 12,579,956 B2
(45) Date of Patent: Mar. 17, 2026

(54) METHODS AND DEVICES FOR PERCEPTION-BASED RENDERING

(71) Applicant: InterDigital CE Patent Holdings, SAS, Paris (FR)

(72) Inventors: Patrick Morvan, Laille (FR); Jurgen Stauder, Montreuil/Ille (FR); Anita Orhand, Rennes (FR); David Touze, Rennes (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 0 days.

(21) Appl. No.: 18/713,545

(22) PCT Filed: Nov. 18, 2022

(86) PCT No.: PCT/EP2022/082412
§ 371 (c)(1),
(2) Date: May 24, 2024

(87) PCT Pub. No.: WO2023/094276
PCT Pub. Date: Jun. 1, 2023

(65) Prior Publication Data
US 2025/0022434 A1     Jan. 16, 2025

(30) Foreign Application Priority Data

Nov. 25, 2021     (EP) ..................................... 21306642

(51) Int. Cl.
*G09G 5/02*          (2006.01)
*G06T 9/00*          (2006.01)
(52) U.S. Cl.
CPC ................. G09G 5/02 (2013.01); G06T 9/00 (2013.01); *G09G 2320/0666* (2013.01); *G09G 2340/06* (2013.01)

(58) Field of Classification Search
CPC ................... G09G 5/02; G09G 3/2003; G09G 2320/0666; G09G 2320/066;
(Continued)

(56) References Cited

U.S. PATENT DOCUMENTS

| | | | |
|---|---|---|---|
| 2013/0027567 A1* | 1/2013 | Sarkar | G01J 3/465 |
| | | | 348/189 |
| 2013/0093783 A1* | 4/2013 | Sullivan | G09G 5/02 |
| | | | 345/601 |

(Continued)

FOREIGN PATENT DOCUMENTS

| | | |
|---|---|---|
| WO | WO 2011124699 A1 | 10/2011 |
| WO | WO 2015007599 A1 | 1/2015 |

OTHER PUBLICATIONS

"Derivation of Basic Television Color Equations", Society of Motion Picture and Television Engineers (SMPTE), SMPTE Practice, RP 177-1993 Reaffirmed 2002, Nov. 1, 1993, 4 pages.
(Continued)

*Primary Examiner* — Brent D Castiaux
(74) *Attorney, Agent, or Firm* — Condo Roccia Koptiw LLP

(57)          ABSTRACT

Methods, devices and video data for encoding, transmitting and decoding a video content item that is rendered and displayed with the same perceived color per any viewer, a content creator included, on any display. The colors wanted by the content creator are encoded in video data in association with master display information corresponding to the display used by the content creator and with master observer information corresponding to the vision characteristics of the content creator. Reciprocally, at decoder side, user display information and user observer information are col- (Continued)

lected. The rendered video on the user display is color adapted by using both the master information and the user information.

24 Claims, 6 Drawing Sheets

(58) Field of Classification Search
CPC .......... G09G 2340/06; G09G 2354/00; G09G 2370/042; G09G 2370/04; G06T 9/00; H04N 1/32101; H04N 9/73; H04N 19/04
See application file for complete search history.

(56) References Cited

U.S. PATENT DOCUMENTS

| | | | | |
|---|---|---|---|---|
| 2018/0013927 | A1* | 1/2018 | Atkins | .................... H04N 9/646 |
| 2019/0266976 | A1* | 8/2019 | Wyble | ..................... G06F 3/147 |
| 2019/0266977 | A1* | 8/2019 | Ward | ................... G09G 3/3208 |

OTHER PUBLICATIONS

Fairchild et al., "Perception in HDR and displays", Society for Information Display (SID), Information Display, vol. 37, May 2021, 5 pages.
"CIE 1931 color space", Wikipedia, the Free Encylopedia, Jun. 26, 2005, 18 pages.
Asano et al., "Categorical observers for metamerism", Wiley Online Library, Color Research and Application, Feb. 16, 2020, 10 pages.
Long et al., "Modeling Observer Variability and Metamerism Failure in Electronic Color Displays", Society for Imaging Science and Technology, Journal of Imaging Science and Technology, vol. 58, Issue 3, May 2024, 14 pages.
"DisplayID 2.0 will gradually replace EDID", High Tech magazine, Nov. 20, 2017, 4 pages.
Fairchild Mark D., "Color Appearance Models", Wiley Online Library, Second Edition, Jun. 18, 2013, 409 pages.
Fairchild et al., "Mean Observer Metamerism and the Selection of Display Primaries", Society for Imaging Science and Technology, 15th Color and Imaging Conference, Albuquerque, New Mexico, Nov. 9, 2007, 6 pages.
Bender et al., "Scale-photo-electro-thermal model for organiclight-emitting diodes", The Institution of Engineering and Technology (IET), IET Optoelectronics, vol. 10, Issue 3, Jun. 2016, 11 pages.
"Mastering Display Color Volume Metadata Supporting High Luminance and Wide Color Gamut Images", Society of Motion Picture and Television Engineers (SMPTE), SMPTE ST 2086:2014, Oct. 13, 2014, 6 pages.
"Personalization definition", Wikipedia, the Free Encyclopedia, Mar. 27, 2005, 6 pages.
"A DTV Profile for Uncompressed High-Speed Digital Interfaces: CTA-861-G", Consumer Technology Association, CTA Technology & Standards Department, Nov. 2017, 218 pages.
"Fundamental Chromaticity Diagram with Physiological Axes", International Commission on Illumination (CIE), Technical Report, CIE 170-1:2006, 2006, 30 pages.
"VESA High-performance Monitor and Display Compliance Test Specification (DisplayHDR CTS)", Video Electronics Standards Association (VESA), VESA DisplayHDR CTS, Revision 1.1, Aug. 29, 2019, 80 pages.
"Dynamic Metadata for Color Volume Transform—Application #1", The Society of Motion Picture and Television Engineers (SMPTE), SMPTE Standard 2094-10:2016, May 18, 2016, 15 pages.
Sarkar et al., "Toward Reducing Observer Metamerism in Industrial Applications: Colorimetric Observer Categories and Observer Classification", Society of Motion Picture and Television Engineers (SMPTE), 18th Color Imaging Conference, San Antonio, Texas, USA, Nov. 8, 2010, 7 pages.
"Signalling, backward compatibility and display adaptation for HDR/WCG video coding", International Telecommunication Union (ITU-T), Telecommunication Standardization Sector of ITU, Series H: Audiovisual and Multimedia Systems, Series H, Supplement 18, Oct. 2017, 42 pages.

* cited by examiner

| Data Byte Number | Contents | Group |
|---|---|---|
| Data Byte 3 | display_primaries_x[0], LSB | 1 |
| Data Byte 4 | display_primaries_x[0], MSB | |
| Data Byte 5 | display_primaries_y[0], LSB | |
| Data Byte 6 | display_primaries_y[0], MSB | |
| Data Byte 7 | display_primaries_x[1], LSB | |
| Data Byte 8 | display_primaries_x[1], MSB | |
| Data Byte 9 | display_primaries_y[1], LSB | |
| Data Byte 10 | display_primaries_y[1], MSB | |
| Data Byte 11 | display_primaries_x[2], LSB | |
| Data Byte 12 | display_primaries_x[2], MSB | |
| Data Byte 13 | display_primaries_y[2], LSB | |
| Data Byte 14 | display_primaries_y[2], MSB | |
| Data Byte 15 | white_point_x, LSB | 2 |
| Data Byte 16 | white_point_x, MSB | |
| Data Byte 17 | white_point_y, LSB | |
| Data Byte 18 | white_point_y, MSB | |
| Data Byte 19 | max_display_mastering_luminance, LSB | 3 |
| Data Byte 20 | max_display_mastering_luminance, MSB | |
| Data Byte 21 | min_display_mastering_luminance, LSB | 4 |
| Data Byte 22 | min_display_mastering_luminance, MSB | |
| Data Byte 23 | Maximum Content Light Level, LSB | 5 |
| Data Byte 24 | Maximum Content Light Level, MSB | |
| Data Byte 25 | Maximum Frame-average Light Level, LSB | 6 |
| Data Byte 26 | Maximum Frame-average Light Level, MSB | |

Figure 7

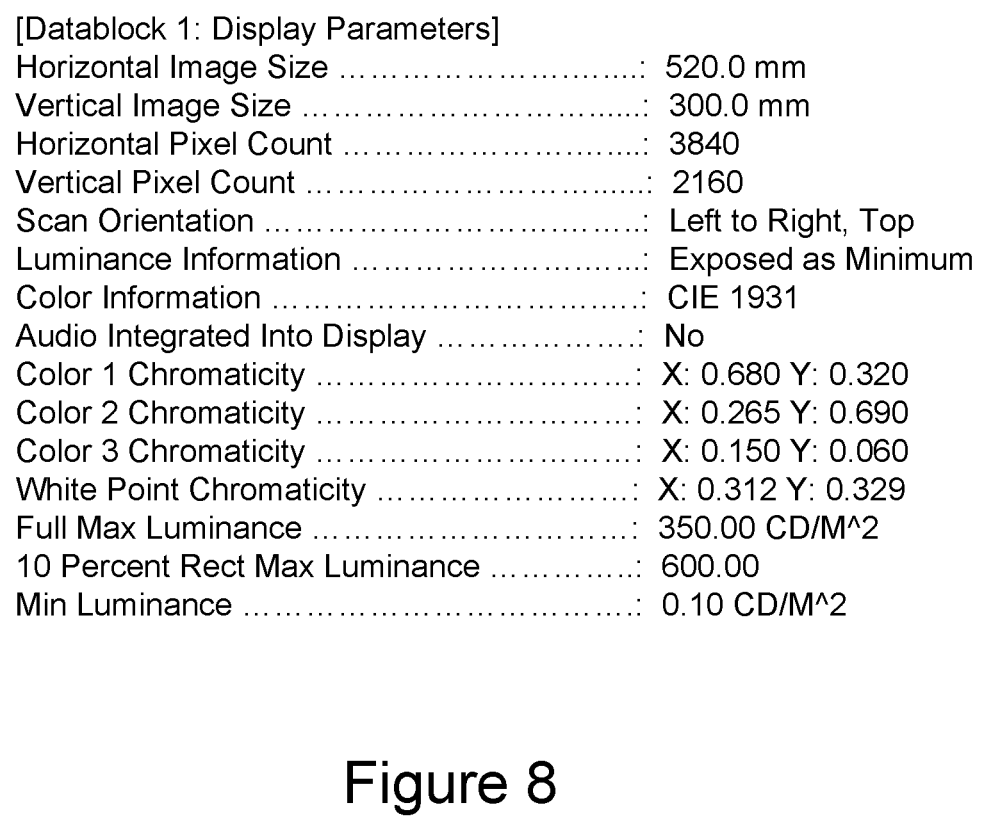

[Datablock 1: Display Parameters]
Horizontal Image Size ............................: 520.0 mm
Vertical Image Size ...............................: 300.0 mm
Horizontal Pixel Count ...........................: 3840
Vertical Pixel Count ..............................: 2160
Scan Orientation ..................................: Left to Right, Top
Luminance Information ...........................: Exposed as Minimum
Color Information ..................................: CIE 1931
Audio Integrated Into Display ...................: No
Color 1 Chromaticity .............................: X: 0.680 Y: 0.320
Color 2 Chromaticity .............................: X: 0.265 Y: 0.690
Color 3 Chromaticity .............................: X: 0.150 Y: 0.060
White Point Chromaticity ........................: X: 0.312 Y: 0.329
Full Max Luminance ..............................: 350.00 CD/M^2
10 Percent Rect Max Luminance ..............: 600.00
Min Luminance ....................................: 0.10 CD/M^2

Figure 8

METHODS AND DEVICES FOR PERCEPTION-BASED RENDERING

CROSS REFERENCE TO RELATED APPLICATIONS

This application is a U.S. National Stage Application under 35 U.S.C. § 371 of International Patent Application No. PCT/EP2022/082412, filed Nov. 18, 2022, which is incorporated herein by reference in its entirety.

This application claims priority to European Application No. 21306642.6 filed Nov. 25, 2021, which is incorporated herein by reference in its entirety.

1. TECHNICAL FIELD

The present principles generally relate to the domain of perception-based rendering of images and video. The present document is also understood in the context of video content adaptation for consumer electronic display devices. The present document may also be understood in the context of the adaptation of colors of images when rendered on different displays and/or for different end-users according to an intention from the content creator.

2. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

Lately, the video production and consumption ecosystem quickly evolved. The end-user viewing experience is improved by providing enhanced images, for example through High Dynamic Range (HDR) or Wide Color Gamut (WCG) features. This is achieved by using end-to-end metadata that are now adopted by main standardization bodies (e.g. SMPTE, MPEG, CTA, HDMI). The consumers' video viewing habits are changing. The video consumption becomes more person-centric. A user wants to watch a same video content on different displays, at any time, under any conditions. The color gamut of displays is also increasing toward bt2020 gamut. But the Observer Metamerism Failure (OMF) will increase in a same way.

The content creator, at the production phase, has a vision of the colorimetry of her/his video. The content creator wants to transmit content that conform this vision. An end-user may consume the video on different displays, however, she/he would like to have the same experience on separate displays. In addition, it would be valuable that two end-users see the same colors on a same display at different times. So, there is a lack for a solution that develops a personalized colorimetric adaptation in a more person-centric video ecosystem.

3. SUMMARY

The following presents a simplified summary of the present principles to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles relate to a method comprising:

obtaining, from video data, a first image, master display information and master observer information;

obtaining user display information and user observer information; and generating a second image by adapting colors of the first image according to a first transform determined according to the master display information and the master observer information and to a second transform determined according to the user display information and the user observer information.

According to different embodiments, the master observer information and/or the user observer information comprise an age and a field size of an observer and the transforms are determined by configuring a physiological model with the master age and field-size. In other embodiments, the master observer information and/or the user observer information comprise an observer category and the transforms are determined according to chromaticity coordinates associated with the observer category. In an embodiment, the first transform is a RGB to XYZ transform and the second transform is a XYZ to RGB transform.

In different combinations of embodiments of the present principles, the master display information and/or the user display information comprise parameters characterizing a gaussian function and the transforms are determined by using the gaussian function as a model of the displays.

The present principles also relate to a device comprising a memory associated with a processor configured to implement the different embodiments of the method above.

The present principles also relate to a device comprising a memory associated with a processor configured to implement the different embodiments of the method above.

The present principles also relate to a method implemented at a production point, comprising:

obtaining a first image, master display information and master observer information; and encoding the first image, the master display information and the master observer information as video data The present principles also relate to a video data comprising an image, a master display information and a master observer information.

4. BRIEF DESCRIPTION OF DRAWINGS

The present disclosure will be better understood, and other specific features and advantages will emerge upon reading the following description, the description making reference to the annexed drawings wherein:

FIG. 7 shows the Mastering InfoFrame, according to a non-limiting embodiment of the present principles;

FIG. 8 shows an example of display parameters stored in the EDID-ROM of a TV set, according to a non-limiting embodiment of the present principles.

5. DETAILED DESCRIPTION OF EMBODIMENTS

Figure 1:
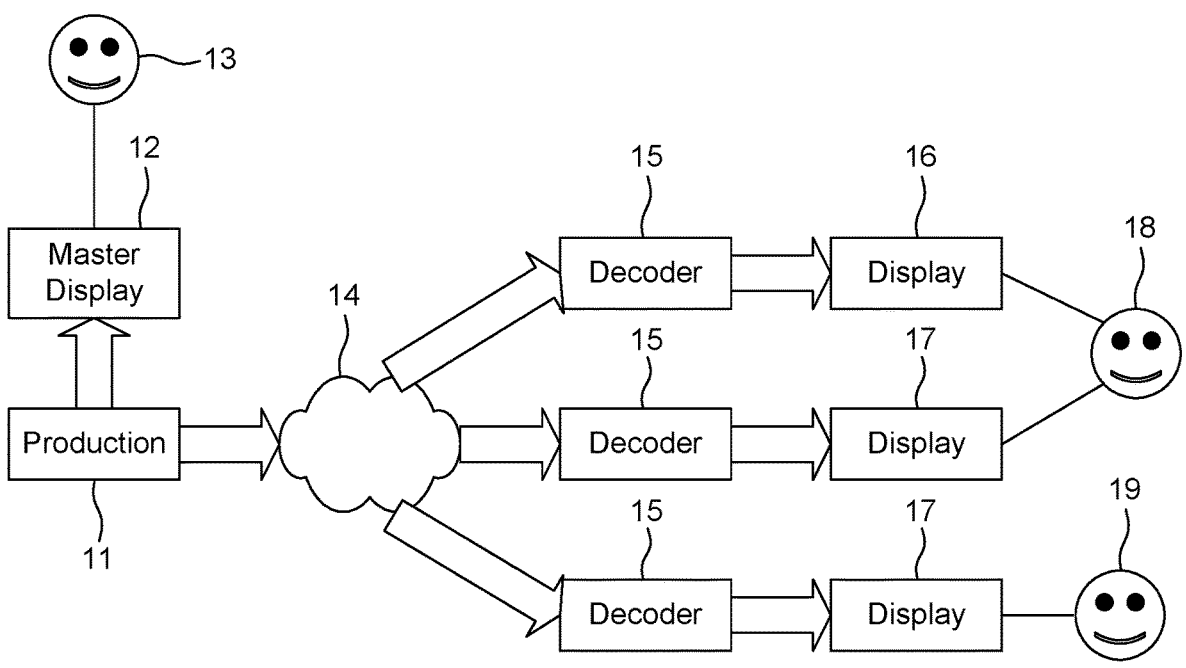
FIG. 1 shows an example video workflow according to an embodiment of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims. While not explicitly described, the present examples and variants may be employed in any combination or sub-combination.

FIG. 1 shows an example video workflow. The video content item is produced at a production system 11. A content creator 13, for example a colorist or a Director Of Photography (DOP), masters the intended rendering while watching the video on a master display 12. Content creator 13 has hers/his own color vision characteristics and watch the images' color on master display 12. The prepared and encoded video content item and associated metadata are transmitted via a network or storage medium 14 to decoders 15. Each decoder 15 decodes and render the video on different displays 16 and 17 to be viewed by different users 18 and 19 who have different color vision characteristics. In a legacy video workflow, user 18 who watches the video on two displays 16 and 17 does not see the same colors on both calibrated displays due to the spectral differences between displays 16 and 17. User 19 who watches the video on the same display 17 does not see the same colors as user 18 because users 18 and 19 do not have the same color vision characteristics. In addition, they do not see the same colors as content creator 13 on master display 12.

The video eco-system quickly evolves as shown in the following table:

| Format | features | Video compression standards (ITU/ISO) |
|---|---|---|
| HD More pixels | 2k, 8 bits, SDR, bt709 color gamut | H.264/AVC (1998-2003) |
| UHD2 Better pixels | 4k, 10 bits, HDR 1000 nits, P3 color gamut Static display metadata | H.265/HEVC (2010-2013) |
| UHD3 | 8k, 10 bits, HDR > 1000 nits, bt2020 gamut Static, dynamic display metadata | H.266/VVC (2018-2020) |

The Ultra-High Definition (UHD) phase2 brings an improved viewing experience thanks to more numerous pixels, better contrast, and higher luminance. The upcoming extended color gamut bt2020 allows the display to reproduce extreme colors for natural or synthetic contents. Standardization committees (e.g. SMPTE, ITU/ISO, CTA, HDMI) have recently adopted the use of end-to-end display metadata (e.g. static ST2086, dynamic ST2094) for adapting at home, the High Dynamic Range (HDR) master content to a version having a different target color volume. Nowadays, the evolution of video consumption becomes more and more individual. The End-User wants to access any content anywhere at any time on any device (e.g. TV set, tablet, smartphone). Video streaming and immersive video format (VR) 360° even accelerates this individualization phenomenon as there is a one-to-one link between the display device and the End-User. Color gamut of displays (e.g. TV, mobile) increases. Nowadays, most displays are capable of reproducing either bt709 Standard Dynamic Range (SDR) gamut or P3 High Dynamic Range (HDR) gamut. Soon, End-User displays will be capable of reproducing bt2020 gamut. New technologies such as Quantum dot, OLED can reproduce more than 80% of bt2020 gamut thanks to narrower primary spectral bandwidth. MiniLED, microLED or laser technologies will allow 100% of bt2020 gamut coverage.

Observer Metamerism is a phenomenon generated by two stimuli with differing Spectral Power Distributions (SPD) that match for a given observer but is an unacceptable match for another. The color vision varies from person to person having normal color vision. For colorimetry, the responses to the stimuli are quantified by the Color Matching Functions (CMFs). A standard colorimetric observer function was defined in 1931. Nowadays, more complex physiological #model allows to derive several categorical observers. A consequence of increasing the display color gamut is a higher color perception variability between observers. For example, variability between observers is higher for bt2020 display having narrow band spectra compared to a bt709 display having broadband spectra.

Figure 2:
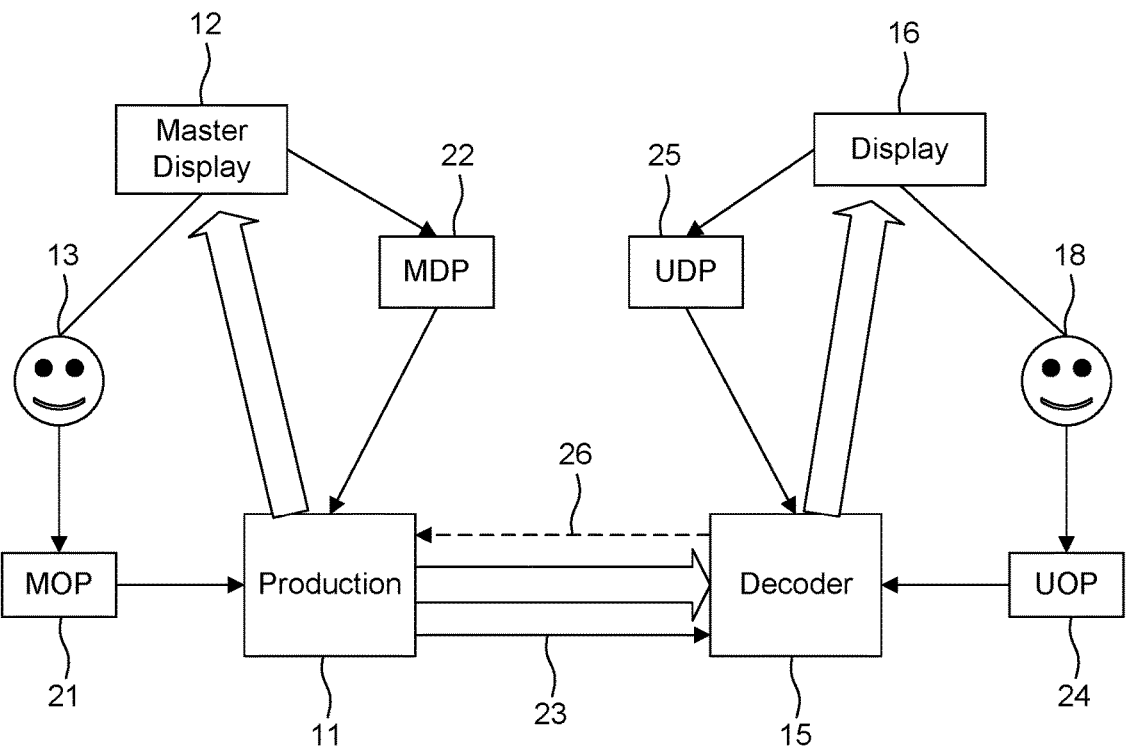
FIG. 2 shows a non-limitative example of video workflow according to the present principles.

FIG. 2 shows a non-limitative example of video workflow according to the present principles. As in the video workflow of FIG. 1, content creator 13 uses master display 12 at production point 11. According to the present principles, observer's parameter and display profiles are gathered. On the production side, Master Observer Parameters (MOP) 21 and Master Display Profile (MDP) 22 are collected as detailed below. These metadata 23 are transmitted in association with the video. At the decoder side, User Observer Parameters (UOP) 24 and User Display Profile (UDP) 25 are collected as described below. In a first embodiment, these parameters are used in association with metadata 23 obtained from the video content to adapt the colorimetry of the video content that is rendered on user display 16. In a second embodiment, for example, if the decoder has low computing and/or memory resources, metadata 26 comprising UOP 25 and UDP 24 are transmitted to production point 11 that perform the colorimetry adaptation and transmits a video content adapted to user vision and user display device, according to the present principles.

Vision parameters for the Master (i.e. content creator 13) and the End-User (MOP 21 and UOP 24) are characterized to create the observers' metadata. Display metadata (MDP 22 and UDP 25) are specified, for example as standardized in "T-REC-H.Sup18-201710-IPDF-E: Signaling, backward compatibility and display adaptation for HDR/WCG video" or "SMPTE ST2086-Mastering Display Color Volume Metadata (MDCV)". These observer and display metadata may be shared between the production point 11 and decoder 15 (that is the consumption point). The video adaptation transform at the user side is calculated and applied, in real time, on the video content either at the production and at the consumption points.

Steps of the method according to the present principles include:
1. Get the observers' perceptual characteristics MOP 21 and UOP 24,
2. Get the colorimetric display profiles MDP 22 and UDP 25
3. Collect observer and display metadata (at the production 11 or consumption 15 point)

4. Repurpose video content for the End-User by:
   Calculating a color transform;
   Optionally transmit this transform as metadata to the End-User display device;
   Apply the color transform on the video content (in production or consumption point).

Figure 3:
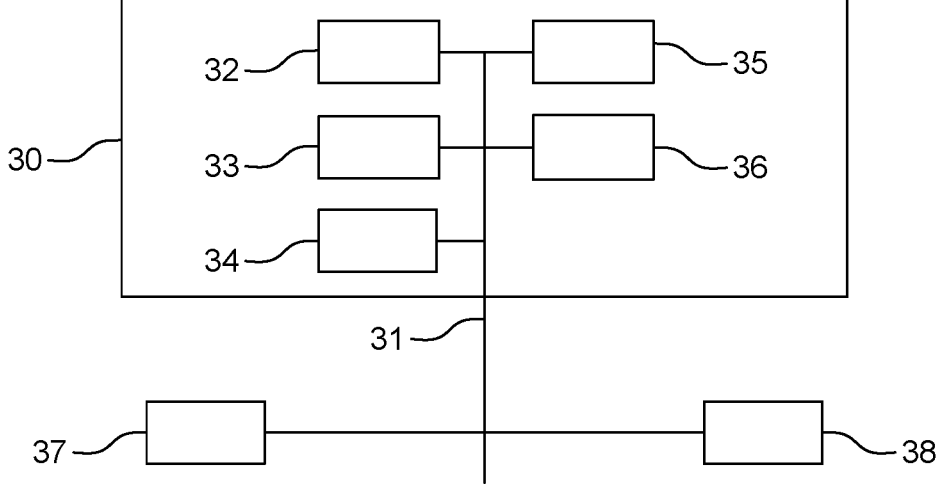
FIG. 3 shows an example architecture of an a color processing engine which may be configured to implement a method described in relation with FIGS. 5 and 6, according to a non-limiting embodiment of the present principles.
Figure 5:
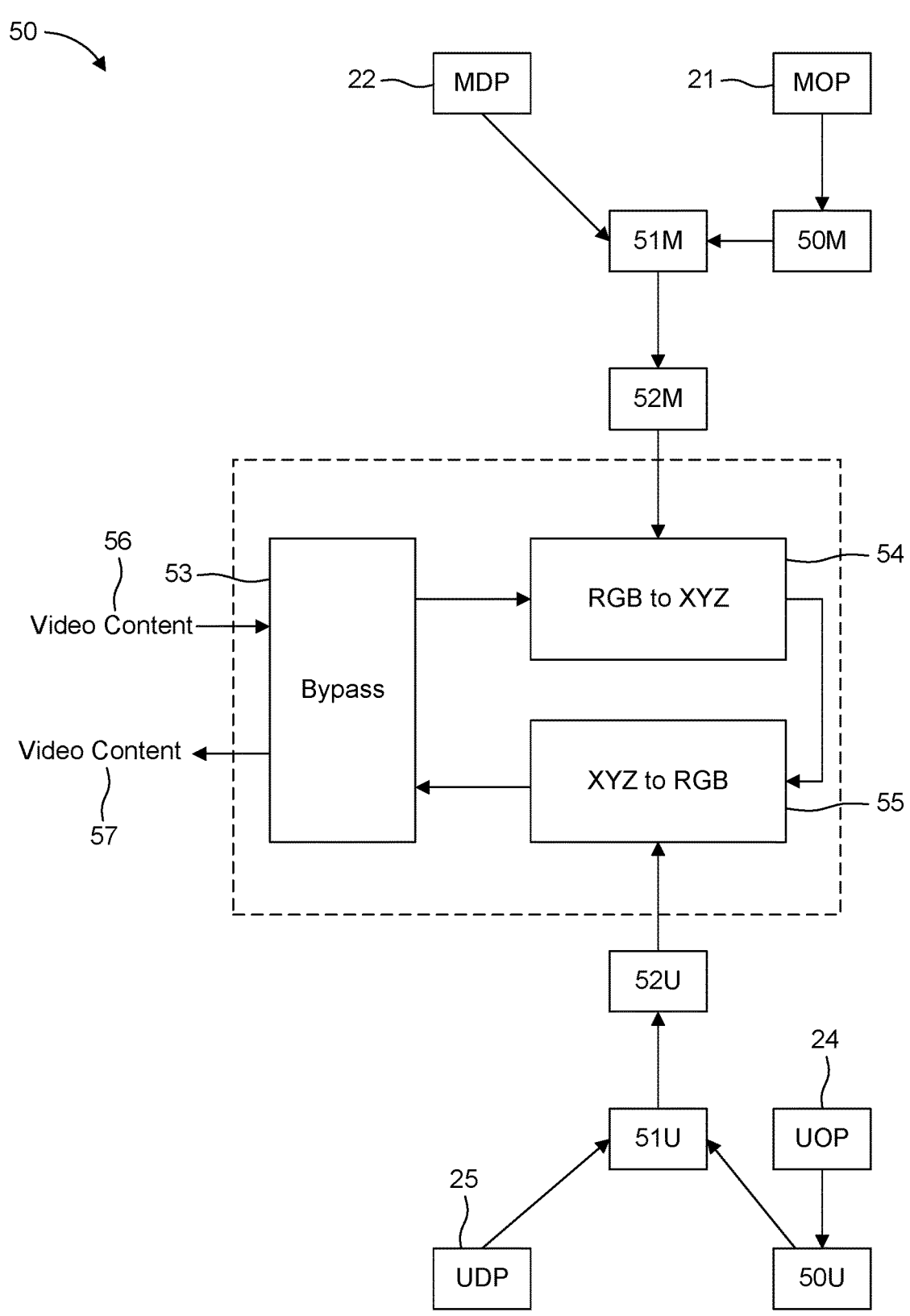
FIG. 5 illustrates a method for adapting colors of a video content according to a first embodiment of the present principles.
Figure 6:
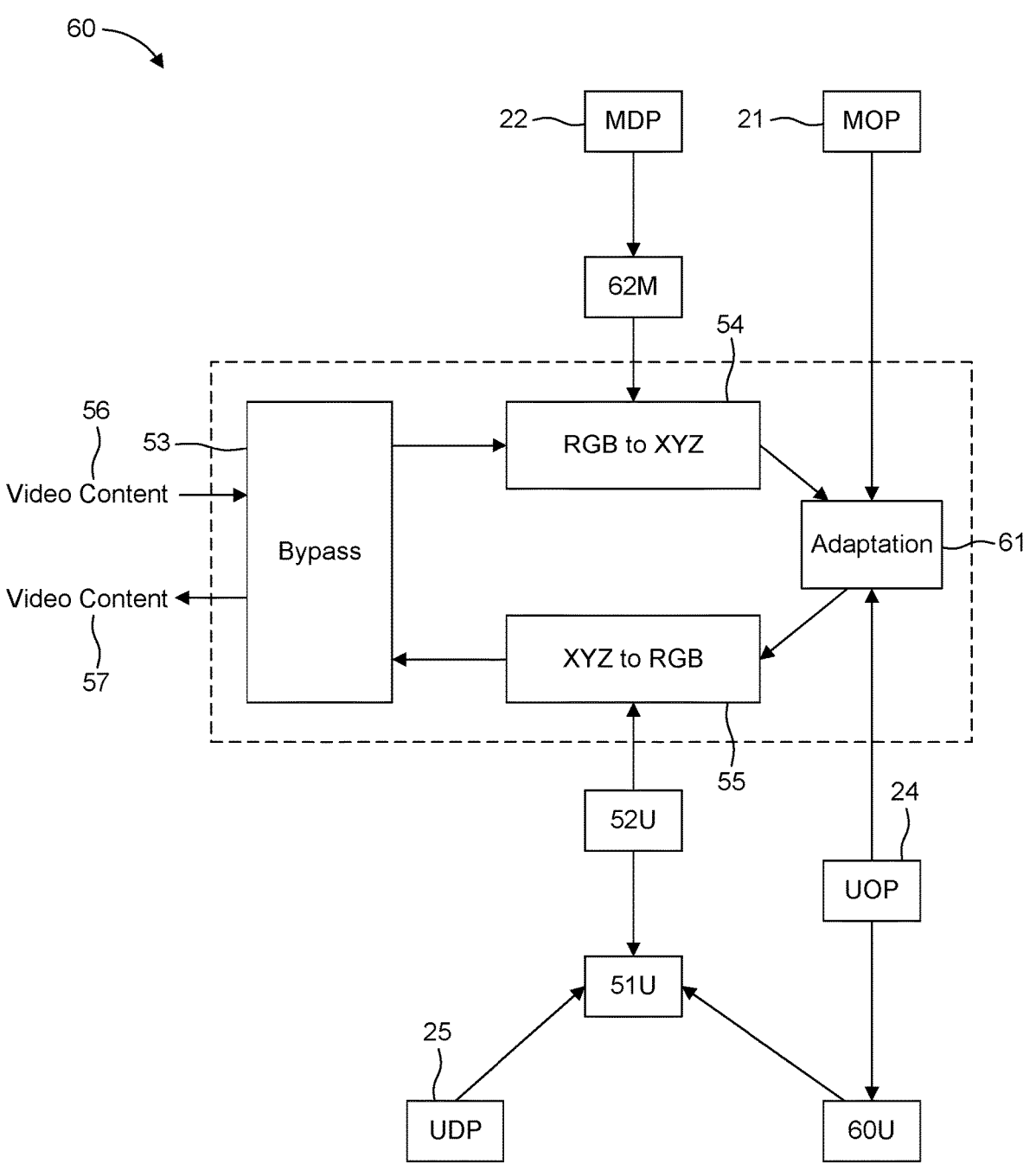
FIG. 6 illustrates a method for adapting colors of a video content according to a second embodiment of the present principles.

FIG. 3 shows an example architecture of a color processing engine 30 which may be configured to implement a method described in relation with FIGS. 5 and 6. A device according to the architecture of FIG. 3 is linked with other devices via their bus 31 and/or via I/O interface 36.

Device 30 comprises following elements that are linked together by a data and address bus 31:
   a microprocessor 32 (or CPU), which is, for example, a DSP (or Digital Signal Processor);
   a ROM (or Read Only Memory) 33;
   a RAM (or Random Access Memory) 34;
   a storage interface 35;
   an I/O interface 36 for reception of data to transmit, from an application; and
   a power supply (not represented in FIG. 3), e.g. a battery.

In accordance with an example, the power supply is external to the device. In each of mentioned memory, the word «register» used in the specification may correspond to area of small capacity (some bits) or to very large area (e.g. a whole program or large amount of received or decoded data). The ROM 33 comprises at least a program and parameters. The ROM 33 may store algorithms and instructions to perform techniques in accordance with present principles. When switched on, the CPU 32 uploads the program in the RAM and executes the corresponding instructions.

The RAM 34 comprises, in a register, the program executed by the CPU 32 and uploaded after switch-on of the device 30, input data in a register, intermediate data in different states of the method in a register, and other variables used for the execution of the method in a register.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Device 30 is linked, for example via bus 31 to a set of sensors 37 and to a set of effectors 38. Sensors 37 may be, for example, cameras, microphones, temperature sensors, Inertial Measurement Units, GPS, hygrometry sensors, IR or UV light sensors or wind sensors. Effectors 38 may be, for example, displays, speakers, vibrators, heat, fan, etc.

In accordance with examples, the device 30 is configured to implement a method described in relation with FIGS. 5 and 6, and belongs to a set comprising:
   a mobile device;
   a communication device;
   a game device;
   a tablet (or tablet computer);
   a laptop;

a connected still picture camera;

a connected video camera;

a TV set.

Figure 4:
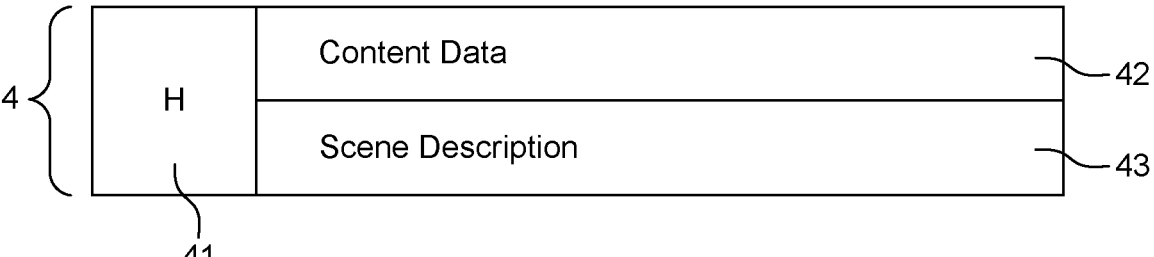
FIG. 4 shows an example of an embodiment of the syntax of a data stream encoding a video content item according to the present principles.

FIG. 4 shows an example of an embodiment of the syntax of a data stream encoding a video content item according to the present principles. FIG. 4 shows an example structure 4 of a video. The structure consists in a container which organizes the stream in independent elements of syntax. The structure may comprise a header part 41 which is a set of data common to every syntax element of the stream. For example, the header part comprises some of metadata about syntax elements, describing the nature and the role of each of them. It may be implemented as Supplemental Enhanced Information (SEI) messages. The structure also comprises a payload comprising an element of syntax 42 and an element of syntax 43. Syntax element 42 comprises data representative of the media content items comprising images of the video. Images and other raw data may have been compressed according to a compression method. Element of syntax 43 is a part of the payload of the data stream and comprises metadata about the images, for example implemented as SEI messages.

According to the present principles, master display profile (MDP 22) is described, for example as provided in the HDR standards for the broadcast applications. SMPTE has adopted the ST2086 document describing the Mastering Display Color Volume (MDCV) metadata that may be used for MDP 22. MPEG has standardized the Supplemental Enhancement Information (SEI) for the display metadata delivery in T-REC-H.Sup18-201710-IPDF-E: "Signaling, backward compatibility and display adaptation for HDR/WCG video". The CTA CEA-861.3 document specifies the Mastering InfoFrame that are transmitted by the host device (set-top box) to the TV device through the HDMI link. These metadata comprise the CIE 1931 chromaticity coordinates (x,y) of the display primaries, the luminance (MaxLum, MinLum) and the content light levels (MaxCLL, Max-FALL).

FIG. 7 shows the Mastering InfoFrame. Data bytes 3 to 22 contain the Display Mastering data defined in ST 2086.

The user display profile (UDP 25) may be described, for example, in the VESA EDID DisplayID document: VESA-DisplayID2.0 "Metadata describing display device". FIG. 8 shows an example of display parameters (chromaticity, luminance) stored in the EDID-ROM of a TV set. These metadata are read and processed by the TV set. In a variant, they can be transmitted to the host device though the Display Data Channel (DDC) of the HDMI interface. If the TV set has low processing capability, then the host can perform the video adaptation.

Advanced HDR metadata (in addition to the mastering display metadata) have been standardized for the home display adaptation. The SMPTE ST2094 or Dynamic Metadata for Color Volume Transform (DMCVT) is a standard for dynamic metadata published by SMPTE. It may be carried in any video compressed contents, for instance via the SEI messages in AVC, HEVC or VVC encoders. It may be carried in any video uncompressed content via the CTA 861-G infoFrame.

The observers' perception parameters (MOP 21 and UOP 24) can be obtained, for example, by using the standardized CIE 2006 model that derives the individual Color Matching Functions (CMF) based on the observer age and the field size. The field size of an observer is the angular size of the human fovea of this particular observer. For CIE 1931, for example, this value is set to 2°; for CIE1964 this value is set to 10°. In a variant, the individual observer categories defined by the improved physiological model described in "Categorical observers for metamerism", Color Res. Appl. 45, 576-585 by Asano, Y. & Fairchild, M. D. (2020) can be used. They are obtained by color matching experiment using color calibrator (eg: application running on a smartphone). Each category number determines the individual CMF that are used for the color imaging adaptation.

For a color stimulus (R,G,B), the display emits light that is defined by its Spectral Power Distributions (SPD). It can be measured using a spectrophotometer. The display characterization is performed in three steps. First, the tri-stimulus values (X,Y,Z) are calculated by applying the Color Matching Functions (CMF_x, CMF_y, CMF_z) of the observer to the Spectral Power Distributions (SPD) of the display. Second, the chromaticity values (x,y,z) are processed and, third, the RGBtoXYZ transform is built. The tri-stimulus values X,Y,Z are defined by equations Eq1.

$$X = \int_{380}^{780} SPD(\lambda) * CMF\_x(\lambda) d\lambda, \qquad \text{Eq 1}$$

$$Y = \int_{380}^{780} SPD(\lambda) * CMF\_y(\lambda) d\lambda,$$

$$Z = \int_{380}^{780} SPD(\lambda) * CMF\_z(\lambda) d\lambda$$

The display chromaticity coordinates x,y, z are defined by equations Eq2.

$$x = \frac{X}{X+Y+Z}, \ y = \frac{Y}{X+Y+Z}, \ z = \frac{Z}{X+Y+Z} \qquad \text{Eq 2}$$

A display is characterized by the primary colors (R,G,B) and the white point stimuli (W). The calculated chromaticity coordinates x,y are listed in the following table:

|   | R | G | B | W |
|---|---|---|---|---|
| x | xr | xg | xb | xw |
| y | yr | yg | yb | yw |
| z | zr | zg | zb | zw |

The RGBtoXYZ transform may be modelized by a 3×3 matrix (M) for an additive display $[XYZ]^T=[M]\times[RGB\_lin-ear]^T$. The matrix coefficients [M] are derived by applying standardized rp177 equation (see SMPTE rp177-1993: Derivation of Basic Television Color Equations) on the chomaticity values from the table above according to equation Eq3.

$$[M] = [P] \times \text{diag}[P^{-1} \times W] \qquad \text{Eq 3}$$

where $P$ is the primary matrix and $W$ the normalized White.

$$P = \begin{bmatrix} xr & xg & xb \\ yr & yg & yb \\ 1-xr-yr & zg1-xg-yg & 1-xb-yb \end{bmatrix} \ W = \begin{bmatrix} xw/yw \\ 1 \\ zw/yw \end{bmatrix}$$

The RGBtoXYZ transform may be modelized by another representation, for example as a Look-Up-Table (LUT or 3D-LUT) or as a parametric model (e.g. as polynomic parameters).

It is possible to predict the magnitude of observer response inconsistencies for a display by using the Observer Metamerism variability indice $OM_{var}$ according to equation Eq4.

$$OM_{var} = \overline{Vol(\Delta(Lab)_p)} \qquad \text{Eq 4}$$

It corresponds to the volume of the color difference ΔLab (between a reference stimulus and the test sample shown on the display) which is computed for each spectral color patch (SPD) in a patch-set P for each observer i in the CMF set. Patch-set P can be for example the 24 colors of the Mac Beth chart.

The greater the $OM_{var}$ value, the higher the probability for a display to exhibit the Observer Metamerism Failure (OMF). The indices of both master and user display profiles may be compared to determine whether a perceptual color adaptation is required. These metrics may be stored in the TV set memory.

Based on the observer and the display characterizations, three kinds of metadata can be transmitted.

In a first embodiment, the observer CMF and the display spectral data SPD are transmitted from production point 11 to the user decoder 15. For example, if the visual spectral range is sampled every 10 nm [380 nm . . . 780 nm], then the three CMF require a minimum of 3×40 floating values. For the four SPD it requires a minimum of 4×40 floating values. The Observer Metamerism index is quantified using a single floating value. By taking 2 bytes per floating value, the following table can be set up:

| Byte nb | Description | Example values |
|---|---|---|
| 0 . . . 79 | Observer CMF_x (40 × 2 bytes) | — |
| 80 . . . 159 | Observer CMF_y (40 × 2 bytes) | — |
| 160 . . . 239 | Observer CMF_z (40 × 2 bytes) | — |
| 240 . . . 319 | Display SPD_R (40 × 2 bytes) | — |
| 320 . . . 399 | Display SPD_G (40 × 2 bytes) | — |
| 400 . . . 479 | Display SPD_B (40 × 2 bytes) | — |
| 480 . . . 559 | Display SPD_W (40 × 2 bytes) | — |
| 560 | Observer Metamerism indice LSB | 0.38 for a bt2020 laser projector |
| 561 | Observer Metamerism indice MSB | |

User decoder 15 collects the CMF and the SPD values and processes the chromaticity coordinates (x,y) by using equations Eq1 and Eq2.

In a second embodiment, to transmit a smaller number of values than in the first embodiment, the CMF may be replaced by the parameter of the CIE 2006 physiological model. Separately or in combination, the display SPD dataset may be replaced by the parameters that characterize a Gaussian function. The four values (P_opt, λ_pk, λ1, λ2) of such a function are transmitted instead of the full SPD dataset (~40 values), as provided in the following example metadata table:

| Byte nb | Description | Example values |
|---|---|---|
| 0 | Observer Physiological model | 0: CIE 2006 |
| 1 | Observer age - CIE 2006 model | 32 years |
| 2 | Observer Field size - CIE 2006 model | 10° field size |
| 3-4 | Display SPD_R optical power (P_opt_r) | 0.003 W/s/m² |

10

-continued

| Byte nb | Description | Example values |
|---|---|---|
| 5-6 | Display SPD_R peak wavelength (λ_pk_r) | 604 nm |
| 7-8 | Display SPD_R wavelength for first half maximum (λ1_r) | 624 nm |
| 9-10 | Display SPD R wavelength for second half maximum(λ2_r) | 642 nm |
| 11-18 | Display SPD_G parameters (P_opt_g, λ_pk_g, λ1_g, λ2_g) | — |
| 11-26 | Display SPD_B parameters (P_opt_b, λ_pk_b, λ1_b, λ2_b) | — |
| 27-34 | Display SPD_W parameters (P_opt_w, λ_pk_w, λ1_w, λ2_w) | — |
| 35-36 | OM, Observer Metamerism indice | 0.38 for a bt2020 laser projector |

User decoder 15 collects the user's age and field size and reconstructs the observer Color Matching Functions (CMF) by using the CIE 2006 model and processes the chromaticity coordinates (x,y) by using equations Eq1 and Eq2. The reconstruction of the Spectral Power Distribution (SPD) of the primaries (SPD_R, SPD_G, SPD_B) and white (SPD_W) is performed by using a Gaussian model parameterized by (P_opt, λ_pk, λ1, λ2). User decoder 15 processes the chromaticity coordinates (x,y) by using equations Eq1 and Eq2.

In a variant of the second embodiment, the advanced model based on observer category may be used. Additional metadata of one byte may be used to transmit an information coding the observer category. The physiological model and the observer category are used to reconstruct the observer CMF in the user decoder which processes the chromaticity coordinates (x,y) by using equations Eq1 and Eq2.

In a variant, the advanced model based on the observer category may advantageously be used. The physiological model and the category number (e.g. 8 for Sarkar model, 10 for Asano model) may be used to reconstruct the observer CMF in the End-User terminal, as in the following example table.

| Byte nb | Description | Example values |
|---|---|---|
| 0 | Observer physiological model | 0: CIE2006 1: Sarkar, 2: Asano |
| 1 | Observer age - CIE 2006 model | 32 years |
| 2 | Observer Field size - CIE 2006 model | 10° field size |
| 3 | Observer category number | 0 to 7 for Sarkar 0 to 10 for Asano |
| 3-4 | Display SPD_R optical power (P_opt_r) | 0.003 W/s/m² |
| 5-6 | Display SPD_R peak wavelength (λ_pk_r) | 604 nm |
| 7-8 | Display SPD_R wavelength for first half maximum (λ1_r) | 624 nm |
| 9-10 | Display SPD_R wavelength for second half maximum(λ2_r) | 642 nm |
| 11-18 | Display SPD_G parameters (P_opt_g, λ_pk_g, λ1_g, λ2_g) | — |
| 11-26 | Display SPD_B parameters (P_opt_b, λ_pk_b, λ1_b, λ2_b) | — |
| 27-34 | Display SPD_W parameters (P_opt_w, λ_pk_w, λ1_w, λ2_w) | — |
| 36-37 | OM, Observer Metamerism indice | 0.38 for a bt2020 laser projector |

Data representation of the present first and the second embodiments may be used for the master and/or user observer information and/or for the master and/or user display information in any combination.

In a third embodiment, the computed chromaticity coordinates are transmitted according to the following example table:

| Byte nb | Description | Example values |
|---|---|---|
| 0 | Observer dependent chromaticity xr LSB | 0.708 |
| 1 | Observer dependent chromaticity xr MSB | |
| 2 | Observer dependent chromaticity yr LSB | 0.292 |
| 3 | Observer dependent chromaticity yr MSB | |
| 4 | Observer dependent chromaticity xg LSB | 0.17 |
| 5 | Observer dependent chromaticity xg MSB | |
| 6 | Observer dependent chromaticity yg LSB | 0.797 |
| 7 | Observer dependent chromaticity yg MSB | |
| 8 | Observer dependent chromaticity xb LSB | 0.131 |
| 9 | Observer dependent chromaticity xb MSB | |
| 10 | Observer dependent chromaticity yb LSB | 0.046 |
| 11 | Observer dependent chromaticity yb MSB | |
| 12 | Observer dependent chromaticity xw LSB | 0.3127 |
| 13 | Observer dependent chromaticity xw MSB | |
| 14 | Observer dependent chromaticity yw LSB | 0.3290 |
| 15 | Observer dependent chromaticity yw MSB | |
| 16 | Observer Metamerism indice LSB | 0.38 for a |
| 17 | Observer Metamerism indice MSB | bt2020 laser projector |

Such metadata only require 18 bytes. User decoder 15 directly uses the chromaticity coordinates (x,y).

FIG. 5 illustrates a method 50 for adapting colors of a video content according to a first embodiment of the present principles. Single-Layer HDR (for example SL-HDR2) video content 56 is received and decoded. Master metamerism index and user metamerism index are also obtained. At an optional step 53, a bypass function or module evaluates the two observer metamerism indices. If the user index value is close to the mastering index value, there is a low probability of an Observer Metamerism Failure (OMF). Then, the method according to the present principles may be bypassed, no color adaptaion is applied. In another case, the color adaptation according tot the present principles is performed. In the first embodiment, master and user observers are considered non-standard. They are characterized by their age and field size.

Master observer parameters (MOP) 21 are obtained from example from the video content data stream. In this embodiment, MOP 21 correspond to master observer CMF. At a step 50M, MOP are derived by configuring the CIE2006 physiological model with the master age and field-size comprised in MOP 21. MOP 21 are transmitted from production point to the decoder, for example, via the SEI messages. Master Display Profile MDP 22 is also obtained. In a variant, MDP 22 parameters are interpreted according to a model as described above according to the selected variant of the present principles. The chromaticity values are calculated using equations Eq1 and Eq2 at step 51M. A first RGB-toXYZ transform is determined, for example as a first RGBtoXYZ matrix. The coefficients of a first RGBtoXYZ matrix are obtained by applying equation Eq3, at step 52M, to the master observer dependent chromaticity values (x,y).

Reciprocally, successively or in parallel, UOP 24, comprising the user observer CMF in this embodiment, are derived, at step 50U, by configuring the CIE2006 physiological model with the user age and field-size. User display Profile UDP 25 is also obtained. The UDP values are, for example, measured by the TV set manufacturer and saved in the EDID-ROM of the TV set. The chromaticity values are calculated using equations Eq1 and Eq2 at step 51U. A second RGBtoXYZ transform is determined, for example as a second RGBtoXYZ matrix. The coefficients of a second RGBtoXYZ matrix are obtained by applying equation Eq3, at step 52U, on the user observer dependent chromaticity values (x,y). A XYZtoRGB transform is obtained by inversing the second RGBtoXYZ transform, for example by inversing the second RGBtoXYZ matrix.

At step 54, the first RGBtoXYZ matrix obtained from step 52M is used to adapt colors of video content 56 and at step 55, XYZtoRGB matrix obtained from step 52U is used to adapt colors of video content to generate an observer and display adapted video content 57 that is rendered on the user display screen.

FIG. 6 illustrates a method 60 for adapting colors of a video content according to a second embodiment of the present principles. Single-Layer HDR (for example SL-HDR2) video content 56 is received and decoded. Master metamerism index and user metamerism index are also obtained. At an optional step 53, a bypass function or module evaluates the two observer metamerism indices. If the user indice value is close to the mastering indice value, there is a low probability of an Observer Metamerism Failure (OMF). Then, the method according to the present principles may be bypassed, no color adaptaion is applied. In another case, the color adaptation according tot the present principles is performed.

In the second embodiment, observer parameters (master's and user's) are defined by observer categories, for example as described in "Toward reducing observer metamerism in industrial applications: colorimetric observer categories and observer classification" by A. Sakar and al. in Eighteenth Color Imaging Conference: Color Science and Engineering Systems, Technologies, and Applications (The Society for Imaging Science and Technology, 2010), 307-313, 2010. By default, the Master observer is set to standard category 0. The metadata are transmitted from production point to the user decoder, for example, via the SEI messages. The UDP values are, for example, measured by the TV set manufacturer and saved in the EDID-ROM of the TV set. MOP 21 is, for example, set to category 0. For such a standard observer, the standard CIE 1931 chromaticity coordinates (x,y obs std) can be retrieved from MDP 22. Coefficients of the first RGBtoXYZ matrix are obtained by directly applying equation Eq3, at step 62M, to the MOP. At a step 61, the first RGB to XYZ transform, for example under the form of a matrix, is adapted according to MOP 21.

In the second embodiment, the user observer parameters are set up, for example, to category 4. The corresponding CMF are derived by setting the physiological model to the obtained category, for example the Sarkar model. For this non-standard observer, the chromaticity values are calculated using equations Eq1 and Eq2 at step 51U. The coefficients of the second RGBtoXYZ matrix are obtained by applying equation Eq3 to the observer dependent chromaticity values (x,y) at step 52U. The XYZtoRGB matrix obtained is the inverse second RGBtoXYZ matrix.

At step 61, based on the two observers category numbers (e.g. category is set to 0 and 4), a correction XYZ to XYZ among 7 possibilities is selected. In the present example, matrix $(M)_{0 \rightarrow 4}$ is selected and applied to XYZ obs0. The transform function may also be encoded in a 3D-LUT.

In an example use case, the video content enriched with metadata according to the present principles is transmitted and rendered on the user display. In this example, the original content shows clothes from an online shop. The user compares the colors of the clothes to the color of some of the clothes that he owns. He identifies the match of one color from a T-shirt in the online shop and the color of a pullover that he has at home.

This color matching operation can be understood for example as a visual match between two colors for the user in the sense of the CIE color matching experiment. Color matching can also be understood as a color harmony for the end user between the different colors of T-shirt and pullover. Color matching can also be understood as identifying a similarity between the two colors that concerns only one aspect of color, for example the hue, while intensity and saturation are different. The color matching can also be carried out by measuring instruments that match the spectral density of the two colors weighted by the cone fundamental functions of the user. The color matching can also be carried out by matching the intensity using a photo diode.

For identifying the color of the T-shirt that matches the pullover, he selects the T-shirt in the online shop. This identifying information is sent back to the server of the shop. For example, the shop operator can watch the original content on the master display related to the T-shirt.

An advantage is that the operator knows that the color of the T-shirt on his mastering display matches the pullover of the user, however, the operator and the user may not have the same human visual characteristics. Additionally, the operator and the user are located at distant places and this identified color match cannot be obtained without physical travel.

Alternatively, to identifying the color of the original content that corresponds to the matched color of the adapted content, the inverse of the color transform according to the present method could be applied to the adapted content corresponding to the matching color resulting into a reconstructed original content corresponding to the matched color. The reconstructed original content is the shown on the mastering display.

The implementations described herein may be implemented in, for example, a method or a process, an apparatus, a computer program product, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method comprising:

obtaining, from video data, a first image, master display information, and master observer's perception information, wherein the master observer's perception information comprises at least one of: a master age and master field-size applied to a physiological model; or an observer category associated with chromaticity coordinates;

obtaining user display information and user observer's perception information, wherein the user observer's perception information comprises at least one of: a user age and user field-size applied to a physiological model; or an observer category associated with chromaticity coordinates; and generating a second image by adapting colors of the first image according to a first transform derived from the master display information and the master observer's perception information and a second transform derived from the user display information and the user observer's perception information.

2. The method of claim 1, wherein the master observer's perception information comprises a master age and a master field-size of an observer's perception at a production point, and wherein the first transform is determined by configuring a physiological model with the master age and the master field-size.

3. The method of claim 1, wherein the master observer's perception information comprises a master observer category, and wherein the first transform is determined according to chromaticity coordinates associated with the master observer category.

4. The method of claim 1, wherein the user observer's perception information comprises a user age and a user field-size of a user, and wherein the second transform is determined by configuring a physiological model with the user age and the user field-size.

5. The method of claim 1, wherein the user observer's perception information comprises a user observer category, and wherein the second transform is determined according to chromaticity coordinates associated with the user observer category.

6. The method of claim 1, wherein the master display information comprises parameters characterizing a gaussian function, and wherein the first transform is determined by using the gaussian function as a model of a master display.

7. The method of claim 1, wherein the user display information comprises parameters characterizing a gaussian function, and wherein the second transform is determined by using the gaussian function as a model of a master display.

8. The method of claim 1, the method further comprising rendering the second image.

9. The method of claim 1, wherein the first transform is a RGB to XYZ transform, and wherein the second transform is a XYZ to RGB transform.

10. A device comprising a memory associated with a processor configured to:

obtain, from video data, a first image, a master display information, and a master observer's perception information, wherein the master observer's perception information comprises at least one of: a master age and master field-size applied to a physiological model; or an observer category associated with chromaticity coordinates;

obtain a user display information and a user observer's perception information, wherein the user observer's perception information comprises at least one of: a user age and user field-size applied to a physiological model; or an observer category associated with chromaticity coordinates; and generate a second image by adapting colors of the first image according to a first transform derived from the master display information and the master observer's perception information and a second transform derived from the user display information and the user observer's perception information.

11. The device of claim 10, wherein the master observer's perception information comprises a master age and a master field-size of an observer at a production point, and wherein the first transform is determined by configuring a physiological model with the master age and the master field-size.

12. The device of claim 10, wherein the master observer's perception information comprises a master observer category, and wherein the first transform is determined according to chromaticity coordinates associated with the master observer category.

13. The device of claim 10, wherein the user observer's perception information comprises a user age and a user field-size of a user, and wherein the second transform is determined by configuring a physiological model with the user age and the user field-size.

14. The device of claim 10, wherein the user observer's perception information comprises a user observer category, and wherein the second transform is determined according to chromaticity coordinates associated with the user observer category.

15. The device of claim 10, wherein the master display information comprises parameters characterizing a gaussian function, and wherein the first transform is determined by using the gaussian function as a model of a master display.

16. The device of claim 10, wherein the user display information comprises parameters characterizing a gaussian function, and wherein the second transform is determined by using the gaussian function as a model of a master display.

17. The device of claim 10, wherein the processor is further configured to render the second image.

18. The device of claim 10, wherein the first transform is a RGB to XYZ transform, and wherein the second transform is a XYZ to RGB transform.

19. A method implemented at a production point, comprising:

obtaining a first image, master display information, and master observer's perception information, wherein the master observer's perception information comprises at least one of: a master age and master field-size applied to a physiological model; or an observer category associated with chromaticity coordinates; and encoding the first image, the master display information, and the master observer's perception information as video data.

20. The method of claim 19, wherein the method comprises:

obtaining user display information and user observer's perception information, wherein the user observer's perception information comprises at least one of: a user age and user field-size applied to a physiological model; or an observer category associated with chromaticity coordinates;

generating a second image by adapting colors of the first image according to a first transform derived from the master display information and the master observer's perception information and a second transform derived from the user display information and the user observer's perception information; and encoding the second image as a video data.

21. The method of claim 20, wherein the first transform is a RGB to XYZ transform, and wherein the second transform is a XYZ to RGB transform.

22. A device at a production point, comprising a memory associated with a processor configured to:

obtain a first image, master display information, and master observer's perception information, wherein the master observer's perception information comprises at least one of: a master age and master field-size applied to a physiological model; or an observer category associated with chromaticity coordinates; and encode the first image, the master display information, and the master observer's perception information as video data.

23. The device of claim 22, wherein the processor is further configured to:

obtain user display information and user observer's perception information, wherein the user observer's perception information comprises at least one of: a user age and user field-size applied to a physiological model; or an observer category associated with chromaticity coordinates;

obtain a second image by adapting colors of the first image according to a first transform derived from the master display information and the master observer's perception information and a second transform derived from the user display information and the user observer's perception information; and encode the second image as a video data.

24. The device of claim 23, wherein the first transform is a RGB to XYZ transform, and wherein the second transform is a XYZ to RGB transform.

* * * * *